(12) United States Patent
Degenstein

(10) Patent No.: US 9,187,122 B2
(45) Date of Patent: Nov. 17, 2015

(54) MOTOR VEHICLE WITH ROAD EVALUATION DEVICE

(71) Applicant: GM GLOBAL TECHNOLOGY OPERATIONS LLC, Detroit, MI (US)

(72) Inventor: Thomas Degenstein, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/257,532

(22) Filed: Apr. 21, 2014

(65) Prior Publication Data

US 2014/0316655 A1 Oct. 23, 2014

(30) Foreign Application Priority Data

Apr. 20, 2013 (DE) ..................... 20 2013 003 767 U

(51) Int. Cl.

| | |
|---|---|
| *G06F 19/00* | (2011.01) |
| *B62D 6/04* | (2006.01) |
| *B62D 5/04* | (2006.01) |
| *B62D 6/00* | (2006.01) |

(52) U.S. Cl.
CPC .............. *B62D 6/04* (2013.01); *B62D 5/0463* (2013.01); *B62D 6/006* (2013.01); *B62D 6/008* (2013.01); *B60W 2550/148* (2013.01)

(58) Field of Classification Search
CPC ............ B62D 6/00; B62D 5/09; B62D 1/046; B62D 5/0424; B62D 7/148; B60W 40/068; B60C 11/0306; B60C 11/0318; B60C 11/11; B60C 11/12; B60C 11/25

USPC ................. 701/41, 42; 152/209.18, 290.22, 152/209.27, 525; 180/410, 412, 413, 421
See application file for complete search history.

(56) References Cited

U.S. PATENT DOCUMENTS

| | | | |
|---|---|---|---|
| 5,010,936 A * | 4/1991 | Numata et al. ........... | 152/209.14 |
| 5,010,982 A * | 4/1991 | Sedlmayr ..................... | 188/4 B |
| 7,434,607 B2 * | 10/2008 | Kajita ........................... | 152/510 |
| 7,625,456 B2 * | 12/2009 | Hanya ........................ | 156/110.1 |
| 8,783,312 B2 * | 7/2014 | Yamada .................... | 152/209.18 |
| 2002/0153077 A1 * | 10/2002 | Hanya ...................... | 152/209.13 |
| 2006/0180259 A1 * | 8/2006 | Kajita ............................ | 152/541 |
| 2012/0145295 A1 * | 6/2012 | Yamada .................... | 152/209.22 |
| 2014/0216618 A1 * | 8/2014 | Makioka et al. ......... | 152/209.18 |

FOREIGN PATENT DOCUMENTS

| | | |
|---|---|---|
| DE | 4440954 A1 | 5/1996 |
| DE | 19947210 A1 | 4/2001 |

(Continued)

*Primary Examiner* — McDieunel Marc
(74) *Attorney, Agent, or Firm* — Ingrassia Fisher & Lorenz PC

(57) ABSTRACT

A motor vehicle includes an adjustable steering assistance. The adjustable steering assistance includes an evaluation unit for evaluating the grip of a road travelled, in which the extent of the steering assistance is variable as a function of the result of the road grip evaluation. The effectiveness of the steering assistance adjustment is due to the fact that the driver is accustom to the hand moment exerted on the steering wheel during steering, conventionally as a fixed relationship to the torque, which for steering the wheels of the motor vehicle has to be exerted thereon. Consequently, the lower the steering resistance the less road grip as a general rule. In that the extent of the steering assistance is varied, a road with less grip can thus be suggested to the driver in order to prompt him to a correspondingly careful driving style.

10 Claims, 1 Drawing Sheet

(56) References Cited

FOREIGN PATENT DOCUMENTS

| DE | 10248401 A1 | 4/2004 |
| DE | 102004036087 A1 | 2/2006 |
| DE | 60203755 T2 | 3/2006 |
| DE | 102007007442 A1 | 12/2007 |
| DE | 102010003867 A1 | 10/2011 |

* cited by examiner

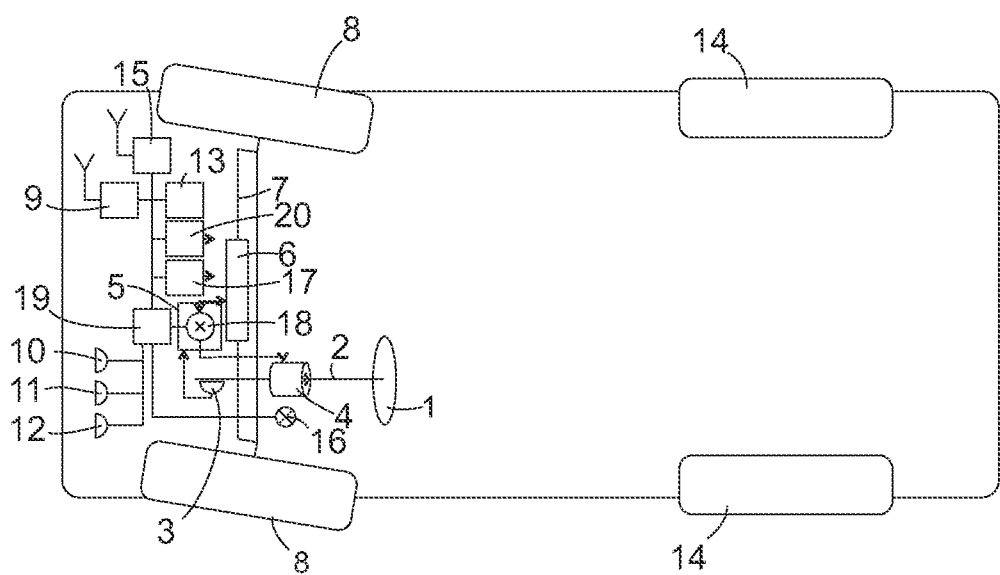

MOTOR VEHICLE WITH ROAD EVALUATION DEVICE

CROSS REFERENCE TO RELATED APPLICATION

This application claims priority to German Patent Application No. 202013003767.9, filed Apr. 20, 2013, which is incorporated herein by reference in its entirety.

TECHNICAL FIELD

The technical field relates to a motor vehicle with a device for evaluating the road grip and adapting steering assistance accordingly.

BACKGROUND

A vehicle is described for example in DE 10 2004 036 087 A1 which determines the current operating condition and the operating mode of the vehicle based on operational data. A control signal is sent to control units for adjusting functional components of the vehicle based on the current operating condition. In particular, control units for chassis and instruments can be switched over into a poor weather mode on the basis of data obtained from various sources in order to take into account reduced road grip in poor weather. In the poor weather mode, the chassis settings for example are to be adapted to a smooth road surface or the maximum speed restricted.

This approach produces the problem that a chassis setting which is harder because of the adaptation to the smooth road suggests to the driver a better grip of the road surface than corresponds to the facts, and because of this can tempt the driver into an unadapted driving style. An automatic restriction of the maximum speed can be perceived as an annoyance, in particular when the driver's estimation of the road grip does not coincide with the estimation by the evaluation device.

SUMMARY

Accordingly, the present disclosure provides a motor vehicle, which can reliably prompt the driver to a driving style that is adapted to the grip of the road surface without giving the driver a feeling of being patronized. A motor vehicle including steering assistance having a device for evaluating the road grip is provided, in which the extent of the steering assistance is variable as a function of the result of the road grip evaluation. The effectiveness of this measure is due to the fact that the driver is used to the hand moment exerted on the steering wheel during steering, conventionally has a fixed relationship to the torque, which for steering the wheels of the motor vehicle has to be exerted thereon. The lower consequently the hand moment, the less grip as a rule there is on the road. In that the extent of the steering assistance is varied, a road with less grip can thus be suggested to the driver in order to prompt him to a correspondingly careful driving style.

As presently preferred, the power steering unit is equipped to exert a steering moment on steerable wheels of the motor vehicle, which corresponds to the hand moment exerted by the driver on a steering wheel multiplied by a proportionality factor, wherein the proportionality factor on a road which is evaluated as having less grip is smaller than on a road which is evaluated as having a good grip.

In the simplest case, the extent of the steering assistance can be switched over between two discrete values for a road with a good grip or reduced grip. Such a switch-over between two discrete values can be perceived by the driver enabling him or her to recognize or at least assume that a change of the hand moment, which is not attributable to visibly changed road characteristics, but is due to an intervention of the evaluation device. When the driver recognizes that switching to the low proportionality factor has taken place, he or she can deduce from this that the evaluation unit evaluates the road grip critically, and take this into account during steering. In one embodiment, a display instrument can be provided, on which the extent of the steering assistance is visualized for the driver.

The device for evaluating the grip should practically be connected to at least one climate sensor in order to take into account the output of said climate sensor in the evaluation. Such a climate sensor can in particular be selected from among a precipitation sensor, a temperature sensor and an air humidity sensor. The precipitation sensor on its own makes possible the decision as to whether the road could be covered by a film of water reducing the grip. The temperature sensor makes possible a decision as to whether water, snow or ice could be present on the road; the air humidity sensor is helpful in particular for estimating the black ice hazard.

Instead of merely estimating the probability for a friction-reducing covering on the road, the grip of the road surface can also be evaluated directly with the help of a friction value or slip sensor. Such a sensor is part of conventional ESP-systems. The sensor of such a system can therefore be practically incorporated into the steering assistance device within the scope of the present disclosure.

The device for evaluating the grip can furthermore be connected to a telematics component for receiving climate or road data from a data source external of the vehicle. Such an external data source can, for example, include a concrete warning against a section of the road located ahead for which it is known that the grip there is reduced at times, for example, because of black ice or traces of oil which have not been removed yet.

The device for evaluating the grip can furthermore be coupled to a navigation system, known per se, in order to be able to estimate and take into account the grip of a section of the road before the vehicle has actually reached this section. Thus, adaptation to an increased black ice probability on a bridge or at a pass altitude, for example, is possible even before reaching the section of the road concerned. When the driver has appropriately reacted to the change of the steering force assistance in such a situation, there is a high probability that the vehicle is already decelerated to an appropriate speed even before reaching the section of the road concerned.

A device for evaluating the road grip can furthermore be equipped to influence an engine control unit as a function of the result of an evaluation of the road grip. Influencing the engine control can, in particular, limit the maximum speed with less grip on the road, or in adapting the relationship between accelerator pedal position and engine load to the grip of the road.

BRIEF DESCRIPTION OF THE DRAWINGS

The present disclosure will hereinafter be described in conjunction with the following drawing FIGURES, wherein like numerals denote like elements, and:

FIG. 1 shows a motor vehicle as a schematic block diagram.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

A steering wheel 1 of the vehicle shown in FIG. 1 is connected to a steering axle 2, on which an angle of rotation sensor 3 and an electric motor 4 or another actuator which is suitable for exerting a torque on the steering axle 2 is arranged. A power steering unit 5 receives measurement values of the angle of rotation sensor 3 and activates a double-acting adjusting cylinder 6 corresponding to these measurement values, which via a track rod 7 controls the track angle of front wheels 8 of the vehicle.

In the exemplary embodiment shown in FIG. 1, there is no mechanical coupling between the wheels and the steering axle, which would allow the driver to directly perceive on the steering wheel 1 the force that is required for steering the front wheels. Instead, a feedback unit 18 of the power steering unit 5 receives a feedback regarding amount and direction of the adjusting force exerted on the track rod 7 by the double-acting adjusting cylinder 6 and activates the electric motor 4 in order to exert a torque T on the steering wheel 1 as a function of this adjusting force. This torque T is perceived by the driver as steering resistance and determines the hand moment which the steering wheel 1 has to exert in order to hold it in its position or turn it.

Obviously, a mechanical connection between steering axle 2 and track rod 7 could also be present which transmits the hand moment exerted by the driver onto the front wheels 8. In such a case, the torque of the electric motor 4 would not be directed against but in the same direction as the hand moment, in order to act on the front wheels 8 together with the hand moment.

In the simplest case, the relationship between torque T and adjusting force F is linear and given by a proportionality factor $a_i$ which is independent of the adjusting force F:

$$T = a_i F$$

But in general a non-linear relationship of the form $T = f_i(F)$ can also exist between torque T and adjusting force F, wherein $f_i$ is a rising function of the adjusting force F.

According to a simple configuration of the present disclosure, a controller or evaluation unit 19 is coupled with the power steering unit 5 and equipped in order to control the selection between two different values of the proportionality factor $a_i$, where i=1, 2 or two different functions $f_i$, where i=1, 2. In this case, $a_1 > a_2$ or $f_1(F) > f_2(F)$ applies to all values of F. For the selection, the evaluation unit 19 can utilize different types of information by themselves or also combined with one another. FIG. 1 shows numerous sources of information wherein it is to be understood that any part quantity of the information sources shown is sufficient in order to implement the present disclosure, and that in addition to the information sources which are shown additional ones can also be present.

A first one of these information sources is a telematics unit 9, which is equipped in order to receive by radio information regarding the road conditions in the vicinity of the vehicle. Such information can originate from radio beacons erected at the road and include information regarding for example black ice, the possibility of aquaplaning or the like on the road. If no information of the telematics unit 9 is present which allow inferring reduced grip on the road surface, the evaluation unit 19 selects the high proportionality factor $a_1$ (or the greater function $f_1$), so that the driver during steering perceives a relatively high resistance through the electric motor 4. If by contrast information indicating reduced grip is present, the evaluation unit 19 reduces the proportionality factor to $a_2$ (or uses the lower function $f_2$), so that the steering is perceived by the driver to be yielding. Since a low steering resistance is typical for reduced friction between wheels and road most drivers react to the reduction of the steering resistance, in particular when it is abrupt, as occurs here through switching between two discrete proportionality factors or functions and is therefore noticed with high probability, by driving more slowly and more careful.

On sections of roads, where no telematics data regarding the road conditions is available, the evaluation unit 19 has to make the decision regarding the proportionality factor to be applied or the function to be applied, based on other information. For this purpose it is connected to a temperature sensor 10, a precipitation sensor 11 and an air humidity sensor 12. In the simplest case, slippery conditions, which justify applying the smaller proportionality factor $a_2$ or the lower function $f_2$ can be assumed when the outside temperature detected by the temperature sensor 10 is in a predetermined range about 0° C. In addition, data of the air humidity sensor 12 can be utilized in that for example slippery conditions are only assumed when the air humidity is above a limit value or in that the limits of the temperature range, within which slippery conditions are assumed, are determined as functions of the air humidity.

When the precipitation sensor 11 reports a significant amount of precipitation, the switch from the high proportionality factor used with a dry road to the low proportionality factor can be made independently of the temperature and air humidity. In addition, the temperature can also be taken into account, for example by selecting between a high proportionality factor with a dry road, a middle proportionality factor with a wet road without frost hazard and a low proportionality factor with a wet road and frost hazard.

An electronic stability program or ESP-system 13 which is known per se, is connected to sensors on rear wheels 14, in order to estimate slip between the wheels 8, 14 and the road on the basis of discrepancies between the speeds of the wheels 8, 14. When this slip exceeds a critical limit value, the evaluation unit 19 switches the power steering 5 over to the low proportionality factor $a_2$ (or the lower function $f_2$), independently of any information that may have been obtained from other sources.

A navigation system 15 can also contribute to determining the extent of the steering assistance, for example, in that it issues information to the evaluation unit 19 shortly before reaching a critical section of the road such as for example a bridge or a hairpin curve, in order to prompt it to switch to major steering assistance, i.e. to the low proportionality factor $a_2$ or the low function $f_2$. When the map material used by the navigation system 15 includes topographical data, the height of the current location of the vehicle—which can be determined with conventional navigation systems—a height of a section of the road to be travelled that can be taken from the topographical data and a temperature measurement value at the current location of the vehicle can be utilized in order to forecast the temperature at this section of the road, using it as a base for deciding the extend of the steering support.

On the instrument panel of the vehicle, a display element 16 can be provided in order to visualize the respective extent of the steering support, for example by switching on a light or changing a visible color when the low proportionality factor $a_2$ or the low function $f_2$ is selected. This makes it possible for the driver to recognize, upon a sudden change of the steering resistance, whether this is exclusively due to characteristics of the road surface or an intervention of the power steering unit 5, and take this information into account during steering.

An engine control unit 17 can be coupled to the evaluation unit 19 in order to use different characteristic curves for the load control of the engine as a function of the position of an accelerator pedal depending on the selected proportionality factor $a_1$ or $a_2$ (or selected function $f_1$, $f_2$). In the case of the characteristic curve used together with the low proportionality factor $a_2$ the increase of the engine load in particular through a given shift of the accelerator pedal can be smaller than with the characteristic curve used with the high proportionality factor $a_1$, or the speed, with which the engine load follows an adjustment of the accelerator pedal is reduced with the low proportionality factor $a_1$ in order to reduce the probability of the driven wheels spinning on a slippery surface. It is also possible that the engine control unit 17, activated by the evaluation unit 19, limits the maximum speed of the vehicle in the case of the low proportionality factor $a_2$. Since the hand moment which is low in this case suggests a slippery road to the driver anyhow, the probability is increased that the driver accepts such a speed restriction as practical and useful without feeling patronized.

In analogous manner, the evaluation unit 19 can influence a distance monitoring device 20 corresponding to its decision regarding the extent of the steering assistance. In particular, a speed-dependent distance to a vehicle travelling ahead, which when undershot, causes the distance monitoring device 20 to issue a warning signal or trigger a braking operation that can be increased as soon as the evaluation unit 19 estimates the grip of the road to be low so as to bring about a greater safety distance on a slippery road.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A motor vehicle having a steering system comprising:
   a controller configured to evaluate road grip of a road on which the motor vehicle is travelling and to generate a control signal based on the road grip; and
   a power steering system operable to steer a set of steerable wheels as a function of a steering assistance function applied to a steering input, the power steering system coupled to controller to receive the control signal;
   wherein the control signal is used to set the steering assistance function,
   wherein the power steering system comprises a steering wheel assembly for exerting a steering moment on two steerable wheels of the motor vehicle as a function of a hand moment applied to a steering wheel, wherein the steering moment corresponds to the hand moment multiplied by a proportionality factor; and
   wherein the control signal sets a first steering assistance function for a first road grip parameter and a second steering assistance function for a second road grip parameter which is less than the first road grip parameter, the second steering assistance function being less than the first steering assistance function.

2. The motor vehicle according to claim 1, wherein the steering assistance function is selected from two discrete values.

3. The motor vehicle according to claim 1 further comprising a display instrument providing a visual indication of the steering assistance function.

4. The motor vehicle according to claim 1 further comprising at least one climate sensor operably coupled with the controller to provide an input signal thereto for evaluating the road grip.

5. The motor vehicle according to claim 4, wherein the at least one climate sensor is selected from the group consisting of a precipitation sensor, a temperature sensor, an air humidity sensor and combinations thereof.

6. The motor vehicle according to claim 1 further comprising a slip sensor operably coupled with the controller to provide an input signal thereto for evaluating the road grip.

7. The motor vehicle according to claim 1 further comprising a telematics component to receive at least one of climate data and road data from an external data source and operably coupled with the controller to provide an input signal thereto for evaluating the road grip as a function of at least one of the climate data and road data.

8. The motor vehicle according to claim 1 further comprising a navigation system to estimate road data based on a vehicle position and operably coupled with the controller to provide an input signal thereto for evaluating the road grip as a function of the road data.

9. The motor vehicle according to claim 1 further comprising an engine control unit operable to control engine load as a function of the position of an accelerator pedal and a load control curve, the engine control unit coupled to controller to receive the control signal, wherein the control signal is used to select the load control curve.

10. The motor vehicle according to claim 1 further comprising a distance monitoring device operable to respond when a distance between the vehicle and an object in front of the vehicle is less than a threshold value, the distance monitoring device coupled to controller to receive the control signal, wherein the control signal is used to adjust the threshold value.

* * * * *